(12) United States Patent
Lei et al.

(10) Patent No.: US 11,991,008 B2
(45) Date of Patent: May 21, 2024

(54) PAYLOAD REDUCTION FOR SEMI-STATIC HARQ-ACK CODEBOOK

(71) Applicant: LENOVO (BEIJING) LIMITED, Beijing (CN)

(72) Inventors: Haipeng Lei, Beijing (CN); Alexander Golitschek Edler von Elbwart, Darmstadt (DE)

(73) Assignee: Lenovo (Beijing) Limted, Beijing (CN)

( * ) Notice: Subject to any disclaimer, the term of this patent is extended or adjusted under 35 U.S.C. 154(b) by 602 days.

(21) Appl. No.: 17/279,584

(22) PCT Filed: Dec. 28, 2018

(86) PCT No.: PCT/CN2018/124789
§ 371 (c)(1),
(2) Date: Mar. 25, 2021

(87) PCT Pub. No.: WO2020/133190
PCT Pub. Date: Jul. 2, 2020

(65) Prior Publication Data
US 2021/0399845 A1 Dec. 23, 2021

(51) Int. Cl.
*H04L 1/1829* (2023.01)
*H04L 1/1607* (2023.01)
*H04L 1/1812* (2023.01)
*H04L 1/1867* (2023.01)

(52) U.S. Cl.
CPC .......... *H04L 1/1864* (2013.01); *H04L 1/1812* (2013.01); *H04L 1/1896* (2013.01)

(58) Field of Classification Search
None
See application file for complete search history.

(56) References Cited

U.S. PATENT DOCUMENTS

2021/0314101 A1* 10/2021 Zhou ..................... H04L 1/1861

FOREIGN PATENT DOCUMENTS

| CN | 105850175 | A |   | 8/2016  |
|----|-----------|---|---|---------|
| CN | 108809534 | A |   | 11/2018 |
| CN | 110351027 | A | * | 10/2019 |
| EP | 3096552   | A1|   | 11/2016 |
| EP | 3857774   | A1|   | 8/2021  |

(Continued)

OTHER PUBLICATIONS

Vivo, Remaining issues on NR CA, 3GPP TSG RAN WG1 Meeting #93, R1-1806073, May 21-25, 2018, pp. 1-5, Busan, Korea.

(Continued)

*Primary Examiner* — Ajit Patel
(74) *Attorney, Agent, or Firm* — Kunzler Bean & Adamson

(57) ABSTRACT

Methods, a remote unit and a base unit are disclosed. According to one embodiment, a remote unit comprising: a receiver that receives, from a base unit, one or multiple downlink transmissions within a channel occupancy time initiated by the base unit; a processor that determines a downlink association set for a HARQ-ACK codebook, excludes one or more downlink slots from the downlink association set based on a predefined rule, and generates the HARQ-ACK codebook corresponding to the downlink association set, wherein the HARQ-ACK codebook comprises HARQ-ACK information bits for the one or multiple downlink transmissions; and a transmitter that transmits the HARQ-ACK codebook to the base unit.

20 Claims, 7 Drawing Sheets

(56) References Cited

FOREIGN PATENT DOCUMENTS

| WO | WO-2017164626 A2 | * | 9/2017 | ........... | H04L 1/1812 |
| WO | WO-2018128474 A1 | * | 7/2018 | ........... | H04L 1/0057 |
| WO | 2018230999 A1 | | 12/2018 | | |

OTHER PUBLICATIONS

3GPP, 3rd Generation Partnership Project; Technical Specification Group Radio Access Network; Physical layer procedures for shared spectrum channel access (Release 15), 3GPP TS 37.213 V15.1.0 (Sep. 2018), pp. 1-20.

International Searching Authority, "Notification of Transmittal of the International Search Report and the Written Opinion of the International Searching Authority, or the Declaration", PCT/CN2018/124789, dated Dec. 28, 2018, pp. 1-7.

* cited by examiner

PAYLOAD REDUCTION FOR SEMI-STATIC HARQ-ACK CODEBOOK

FIELD

The subject matter disclosed herein generally relates to wireless communications and, more particularly, to payload reduction for semi-static hybrid automatic repeat request acknowledgement (HARQ-ACK) codebook.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Frequency Range 2 (FR2), Physical Uplink Shared Channel (PUSCH), Physical Downlink Control Channel (PDCCH), Sounding Reference Signal (SRS), SRS Resource Indicator (SRI), Downlink Control Information (DCI), Resource Block (RB), Non Zero Power (NZP) Channel State Information Reference Signal (CSI-RS), Control Resource Set (CORESET), Bandwidth Part (BWP), Quasi Co-location (QCL), Transmission Configuration Indicator (TCI).

In 3GPP Release 15 and onwards, NR defines two kinds of HARQ-ACK feedback modes: TB-based HARQ-ACK and CBG-based HARQ-ACK. HARQ-ACK in this document represents collectively the Positive Acknowledgement (ACK) and the Negative Acknowledgement (NACK). TB-based ACK indicates that TB has been correctly received while NACK indicates that TB has been erroneously received. One TB-based HARQ-ACK feedback bit corresponds to one TB. As long as one CB (code block) of a given TB is not correctly decoded at receiver side, the whole TB will be reported with a "NACK". So the transmitter has to retransmit all the CBs of the TB. Basically, the intention of CBG is to group several code blocks into one code block group (CBG) and the resulting HARQ-ACK feedback is generated per CBG. Only when all of the code blocks within one CBG are correctly decoded the HARQ-ACK for the CBG can be set to "ACK"; otherwise, it is set to "NACK". Upon the reception of the HARQ-ACK feedback, only the CBG(s) with "NACK" shall be retransmitted by the transmitter. For CBG-based HARQ-ACK feedback, RRC signaling is used to configure the maximum number of CBGs per TB. When CBG-based HARQ-ACK feedback is configured, for both semi-static HARQ-ACK codebook and dynamic HARQ-ACK codebook, the number of HARQ-ACK bits for one TB is equal to the configured maximum number of CBGs per TB, regardless of the variable TBS of a given TB.

The HARQ-ACK feedback bits corresponding to the PDSCH are transmitted either on the Physical Uplink Control Channel (PUCCH) or on the Physical Uplink Shared Channel (PUSCH). A downlink association set is a set of slots for which the HARQ bits are combined into one corresponding HARQ-ACK codebook.

BRIEF SUMMARY

Methods and apparatuses for payload reduction for semi-static HARQ-ACK codebook are disclosed.

In one embodiment, a remote unit, comprises: a receiver that receives, from a base unit, one or multiple downlink transmissions within a channel occupancy time initiated by the base unit; a processor that determines a downlink association set for a HARQ-ACK codebook, excludes one or more downlink slots from the downlink association set based on a predefined rule, and generates the HARQ-ACK codebook corresponding to the downlink association set, wherein the HARQ-ACK codebook comprises HARQ-ACK information bits for the one or multiple downlink transmissions; and a transmitter that transmits the HARQ-ACK codebook to the base unit.

In another embodiment, a base unit, comprises: a transmitter that transmits, to a remote unit, one or multiple downlink transmissions within a channel occupancy time; a processor that determines a downlink association set for a HARQ-ACK codebook and excludes one or more downlink slots from the downlink association set based on a predefined rule, herein the HARQ-ACK codebook corresponding the downlink association set comprises HARQ-ACK information bits for the one or multiple downlink transmissions; and a receiver that receivers the HARQ-ACK codebook from the remote unit.

In another embodiment, a method at a remote unit, comprises: receiving, from a base unit, one or multiple downlink transmissions within a channel occupancy time initiated by the base unit; determining a downlink association set for a HARQ-ACK codebook; excluding one or more downlink slots from the downlink association set based on a predefined rule; generating the HARQ-ACK codebook corresponding to the downlink association set, wherein the HARQ-ACK codebook comprises HARQ-ACK information bits for the one or multiple downlink transmissions; and transmitting the HARQ-ACK codebook to the base unit.

In another embodiment, a method at a base unit, comprises: transmitting, to a remote unit, one or multiple downlink transmissions within a channel occupancy time; determining a downlink association set for a HARQ-ACK codebook; excluding one or more downlink slots from the downlink association set based on a predefined rule, wherein the HARQ-ACK codebook corresponding the downlink association set comprises HARQ-ACK information bits for the one or multiple downlink transmissions; and receiving the HARQ-ACK codebook from the remote unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
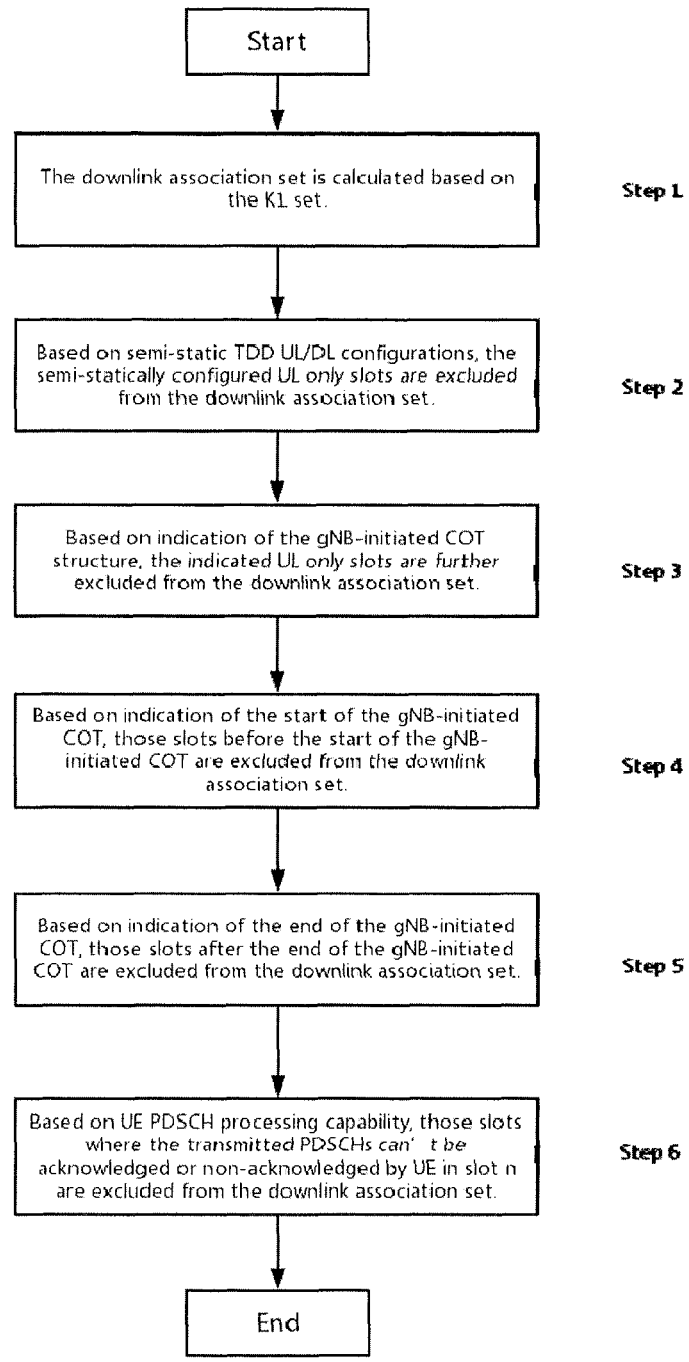
FIG. 1 is a flow chart diagram illustrating a method for a UE to determine the downlink association set for the semi-static HARQ-ACK codebook according to a first embodiment.

As will be appreciated by one skilled in the art, aspects of the embodiments may be embodied as a system, apparatus, method, or program product. Accordingly, embodiments may take the form of an entire hardware embodiment, an entire software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

This invention is targeted to 3GPP 5G new radio (NR) especially for HARQ-ACK transmission on unlicensed spectrum.

HARQ-ACK feedback for multiple PDSCHs can be multiplexed in one HARQ-ACK codebook by means of HARQ-ACK multiplexing. In NR a HARQ-ACK codebook includes multiple HARQ-ACK bits for multiple CBG(s) of one TB, multiple TB(s)/codeword(s) on one PDSCH, multiple PDSCHs in time domain or multiple PDSCHs on multiple configured component carriers.

There are two methods for HARQ-ACK codebook determination for NR Rel-15, semi-static HARQ-ACK codebook (also referred as Type 1 in TS38.213) and dynamic HARQ-ACK codebook (also referred as Type 2 in TS38.213). This invention focuses on the semi-static HARQ-ACK codebook.

For semi-static HARQ-ACK codebook determination defined in NR, within a given DL association set, candidate PDSCH occasions are determined based on the set of slot timing values $K_1$, PDSCH symbol allocation table in time domain and semi-static UL/DL configuration.

Consequently, semi-static HARQ-ACK codebook is determined based on the following factors:

Number of valid slots within each downlink association set. Specifically, the slots derived from n-$K_1$ are included in the downlink association set, where at least one symbol configured as UL by semi-static UL/DL configuration is excluded from the downlink association set.

Number of TBs on one PDSCH

Number of configured DL carriers

Max number of non-overlapped PDSCH occasions per slot per cell.

Max number of CBGs per TB. This is configured by RRC signaling when CBG-based HARQ-ACK feedback is configured.

Since the size of the semi-static HARQ-ACK codebook is dependent on the multiplication of the numbers mentioned above, the current solution for semi-static HARQ-ACK codebook determination leads to a relatively large HARQ-ACK codebook. In some cases, the HARQ-ACK codebook may be quite large.

For example, if UE is configured with C carriers, where C1 carriers are configured for TB-based retransmission and C2 carriers are configured for CBG-based retransmission, C=C1+C2, and if maximum M CBGs per TB are configured for CBG-based carriers, assuming the downlink association set size is N, then the semi-static HARQ-ACK codebook size is equal to (C1+C2*M)*N in case each PDSCH carries one TB. If each PDSCH on some carriers can carry two TBs, the semi-static HARQ-ACK codebook size shall be further enlarged.

The benefit for semi-static HARQ-ACK codebook is that the codebook size determination is quite simple. There is no ambiguity between UE and gNB on determining HARQ-ACK codebook size even when some DL transmissions are missed. However, the drawback is that the overhead is quite large. Especially considering the fact that introduction of PDSCH-to-HARQ_feedback timing indicator field that itself has a large size has already been agreed in RAN1, for semi-static HARQ-ACK codebook. Hence, UE needs to report much more HARQ-ACK bits than those in NR Rel-15. Therefore, methods for payload reduction for semi-static HARQ-ACK codebook determination are necessary. It is noted that any method for payload reduction should guarantee the same understanding between gNB and UE with respect to the HARQ-ACK codebook.

This invention is aimed at the HARQ-ACK payload reduction for semi-static HARQ-ACK codebook determination.

Before describing the novelty solution of this invention, the conventional solution for determining the downlink association set for semi-static HARQ-ACK codebook is presented below, which is described in TS38.213-r15 after RAN1 #95 meeting.

For a serving cell c, an active DL BWP, and an active UL BWP, UE determines a set of $M_{A,c}$ occasions for candidate PDSCH receptions for which the UE can transmit corresponding HARQ-ACK information in slot $n_U$ on PUCCH. If the serving cell c is deactivated, the UE uses the active DL BWP to determine the set of $M_{A,c}$ occasions for candidate PDSCH receptions on DL BWP provided by firstActiveDownlinkBWP. The determination is based on a set of slot timing values $K_1$ associated with the active UL BWP. If the UE is configured to monitor PDCCH for DCI format 1_0 and is not configured to monitor PDCCH for DCI format 1_1 on a serving cell c, $K_1$ is provided by the slot timing values {1, 2, 3, 4, 5, 6, 7, 8} for DCI format 1_0. If the UE is configured to monitor PDCCH for DCI format 1_1 for the serving cell c, $K_1$ is provided by dl-DataToUL-ACK for DCI format 1_1.

The determination is further based on a set of row indexes R of a table that is provided either by a first set of row indexes of a table that is provided by PDSCH-TimeDomainResourceAllocationList in PDSCH-ConfigCommon or by Default PDSCH time domain resource allocation A [6, TS 38.214], or by the union of the first set of row indexes and a second set of row indexes, if provided by PDSCH-TimeDomainResourceAllocationList in PDSCH-Config, associated with the active DL BWP and defining respective sets of slot offsets $K_0$, start and length indicators SLIV, and PDSCH mapping types for PDSCH reception as described in [6, TS 38.214].

The determination is further based on the ratio $2^{\mu_{DL}-\mu_{UL}}$ between the downlink subcarrier spacing (SCS) configuration $\mu_{DL}$ and the uplink SCS configuration $\mu_{UL}$ provided by subcarrierSpacing in BWP-Downlink and BWP-Uplink for the active DL BWP and the active UL BWP, respectively.

The determination is further based on TDD-UL-DL-ConfigurationCommon and TDD-UL-DL-ConfigDedicated as described in Subclause 11.1, if provided.

For the set of slot timing values $K_1$, the UE determines a set of $M_{A,c}$ occasions for candidate PDSCH receptions or SPS PDSCH releases. A location in the Type-1 HARQ-ACK codebook for HARQ-ACK information corresponding to a SPS PDSCH release is same as for a corresponding SPS PDSCH reception.

As described above, according to the conventional solution, it leads to a relatively large HARQ-ACK codebook. In some cases, the HARQ-ACK codebook may be extremely large. Therefore, this disclosure focuses on the HARQ-ACK payload reduction for semi-static HARQ-ACK codebook determination.

FIG. 1 is a flow chart diagram illustrating a method for a UE to determine the downlink association set for the semi-static HARQ-ACK codebook according to a first embodiment.

In this invention, several solutions for payload reduction for semi-static HARQ-ACK codebook determination are proposed for NR access on unlicensed spectrum (NR-U).

In one embodiment, one semi-static HARQ-ACK codebook is to be transmitted in slot n, wherein n is determined by PDSCH-to-HARQ_feedback timing field in DCI. The downlink association set for the semi-static HARQ-ACK codebook is determined according to the procedure illustrated in FIG. 1.

At step 1, the downlink association set is calculated based on a set $K_1$ used to derive a set of slots {n–k0, n–k1, . . . , n–k7}, with $K_1$ set denoted as {k0, k1, . . . , k7} and k0<k1< . . . <k7, where n is the index of the slot for the HARQ-ACK codebook transmission.

In this embodiment, set $K_1$ is assumed to have up to 8 values to follow NR Rel-15 principle by which the invention is not limited. In the future, set $K_1$ may be configured with more than 8 values to expand the timing indication scope with PDSCH-to-HARQ_feedback timing field, correspondingly, having more than 3 bits in DCI. Alternatively, set $K_1$ may be configured with up to 8 values and the values may be larger than 15 in order to expand the timing indication scope to the end of the longest COT (channel occupation time). In this way, PDSCH-to-HARQ_feedback timing field may still use 3 bits in DCI.

At step 2, based on semi-static TDD UL/DL configurations by RRC signaling, the slots which are semi-statically configured only for UL are excluded from the downlink association set.

At step 3, based on the indication of the gNB-initiated COT structure, the slots indicated only for UL are excluded from the downlink association set. Here, based on COT structure indication at the beginning of the gNB-initiated COT, UE is aware of the COT structure, i.e., UL/DL split pattern, the number and location of the UL-to-DL and DL-to-UL switching point(s), the location and duration of DL bursts and UL bursts including the starting position and the ending position of the gNB-initiated COT. The COT structure indication may be transmitted in DCI format 2_0 to indicate the slot combinations for all the slots within the gNB-initiated COT.

At step 4, based on the indication of the start of the gNB-initiated COT, those slots before the start of the gNB-initiated COT are excluded from the downlink association set.

At step 5, based on the indication of the end of the gNB-initiated COT, those slots after the end of the gNB-initiated COT are excluded from the downlink association set.

At step 6, based on UE PDSCH processing capability, those slots where the transmitted PDSCHs cannot be acknowledged or non-acknowledged by UE in slot n are excluded from the downlink association set. UE PDSCH processing capability is reported by UE to gNB.

In the procedure described above, although the procedure is described from a UE's perspective in context, the similar procedure is performed at a gNB in order to guarantee the same understanding on the downlink association set between gNB and UE.

Figure 2:
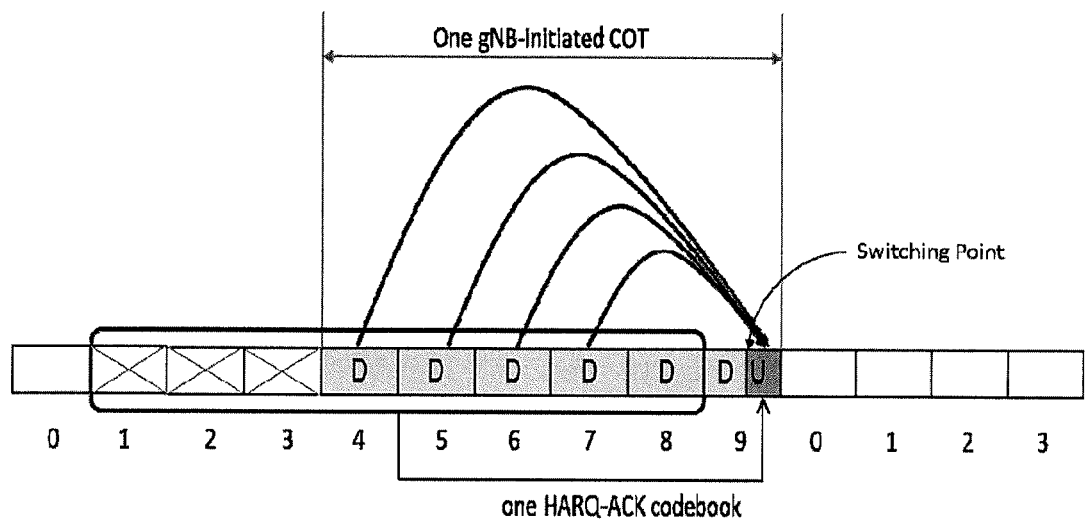
FIG. 2 is a schematic diagram illustrating an example on semi-static HARQ-ACK codebook size reduction according to the first embodiment.

FIG. 2 is a schematic diagram illustrating an example on semi-static HARQ-ACK codebook size reduction according to the first embodiment.

In FIG. 2, one gNB-initiated COT comprises slots 4 to 9 with single switching point, with set $K_1$ being {1, 2, 3, 4, 5, 6, 7, 8} slots and slot 9 being assigned to HARQ-ACK feedback transmission.

Based on processing performed in step 1 identified in FIG. 1, the downlink association set includes slots 1, 2, 3, 4, 5, 6, 7, and 8.

Assuming there is no slots identified in step 2 of the process identified in FIG. 1, which are semi-statically configured for UL only in the set of slots 1, 2, 3, 4, 5, 6, 7, and 8 based on semi-static TDD UL/DL configurations, the current downlink association set still includes slots 1, 2, 3, 4, 5, 6, 7, and 8.

In step 3 of FIG. 1, further assuming there is no slot indicated only for UL in the set of slots 1, 2, 3, 4, 5, 6, 7, and 8 based on indication of the gNB-initiated COT structure, the current downlink association set still consists of slots 1, 2, 3, 4, 5, 6, 7, and 8. On the other hand, if there are slots within the set of slots 1, 2, 3, 4, 5, 6, 7, and 8 identified only for UL based on the indication of the gNB-initiated COT structure, the slots identified only for UL should be excluded from the downlink association set.

Performing step 4 depicted in FIG. 1, slots 1, 2 and 3 are excluded from the set of slots 1, 2, 3, 4, 5, 6, 7, and 8, because those slots are transmitted before the start of the gNB-initiated COT. So, the current downlink association set still includes slots 4, 5, 6, 7, and 8.

In step 5 of FIG. 1, since slot 9 is within the gNB-initiated COT, that is, there are no slots after the end of the gNB-initiated COT, no slot is excluded in this step. So, the current downlink association set includes slots 4, 5, 6, 7, and 8.

Through the processing in step 6 in FIG. 1, assuming UE needs at least one slot from the end of PDSCH reception to the beginning of the HARQ-ACK transmission based on UE PDSCH processing capability, slot 8 is excluded from the current downlink association set. So the current downlink association set may now include slots 4, 5, 6, and 7.

As shown in FIG. 2, the proposed downlink association set determination method can downsize the final set to {4, 5, 6, 7} slots from the initial set of {1, 2, 3, 4, 5, 6, 7, 8} slots, which greatly reduces the semi-static HARQ-ACK feedback overhead.

Figure 3:
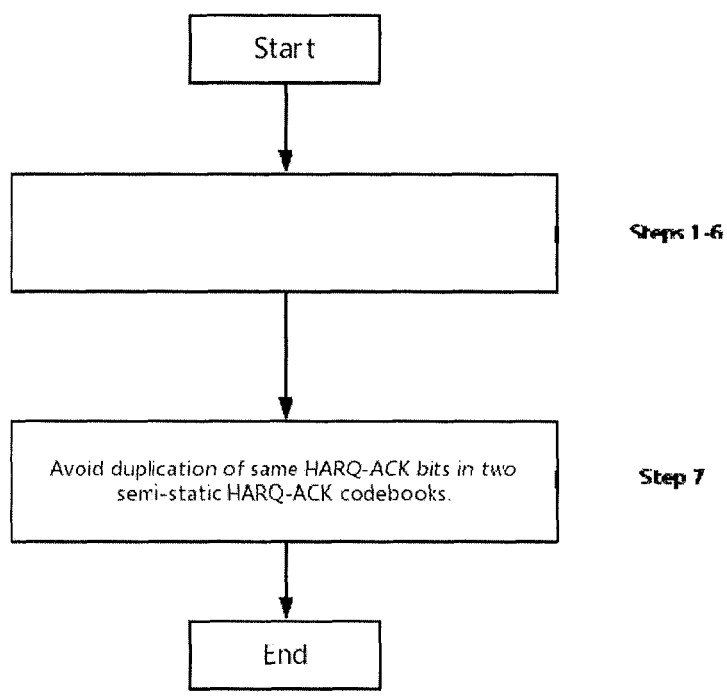
FIG. 3 is a flow chart diagram illustrating a method for a UE to determine the downlink association set for the semi-static HARQ-ACK codebook according to a second embodiment.

FIG. 3 is a flow chart diagram illustrating a method for a UE to determine the downlink association set for the semi-static HARQ-ACK codebook according to a second embodiment.

When the downlink association sets for more than one semi-static HARQ-ACK codebook overlap in time domain, the semi-static HARQ-ACK codebook size can be further reduced by avoiding duplication of HARQ-ACK feedback transmission for the overlapping slots. Hence, according to a second embodiment, the downlink association set for the semi-static HARQ-ACK codebook is determined with a new additional step 7 performed after the steps 1 to 6 identified in FIG. 1 as shown in FIG. 3.

Here a situation is discussed where the overlapping slots are between two downlink association sets for two semi-static HARQ-ACK codebooks.

According to the second embodiment, at step 7, the overlapping slots are all kept in either one of the two downlink association sets.

According to a first variation of the second embodiment, at step 7, those overlapping slots are split into a first part kept in the downlink association set of the first HARQ-ACK codebook and a second part kept in the downlink association set of the second HARQ-ACK codebook. When this variation is implemented it is preferred that approximately half of the overlapping slots are kept in one downlink association set and the other half is kept in the other downlink association set.

According to a second variation of the second embodiment, at step 7, whether those overlapping slots are kept or excluded in the downlink association set is dynamically determined by the PDSCH-to-HARQ_feedback timing field in DCI. Therefore, if PDSCH-to-HARQ_feedback timing field indicates that the PDSCH is to be acknowledged or non-acknowledged in the first HARQ-ACK codebook, the slot where the PDSCH is transmitted is included in the downlink association set of the first HARQ-ACK codebook. And if PDSCH-to-HARQ_feedback timing field indicates that the PDSCH is to be acknowledged or non-acknowledged in the second HARQ-ACK codebook, the slot where the PDSCH is transmitted is included in the downlink association set of the second HARQ-ACK codebook.

Figure 4:
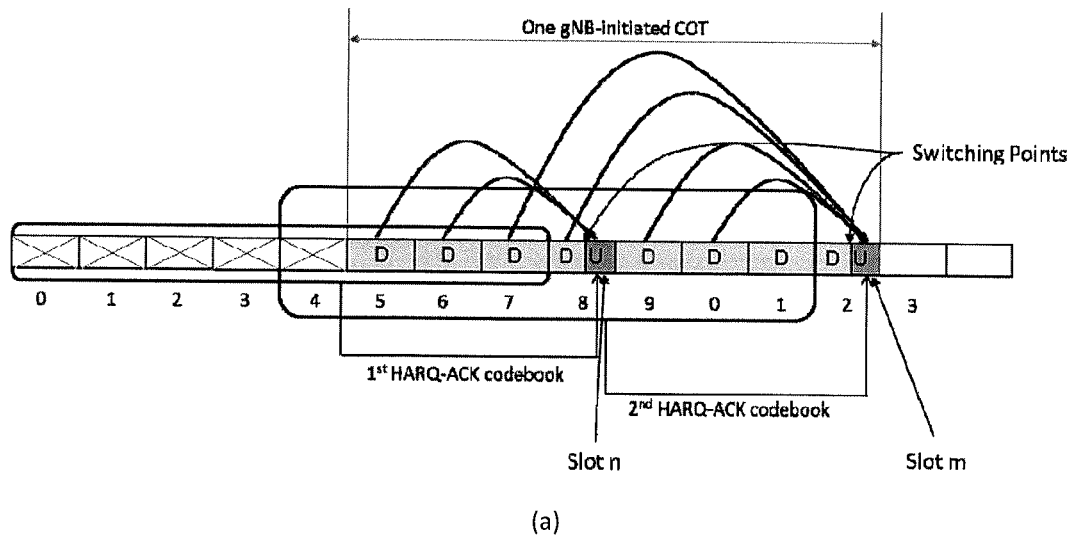
FIGS. 4(*a*) and 4(*b*) are schematic diagrams illustrating an example on semi-static HARQ-ACK codebook size reduction according to a second embodiment.
Figure 4:
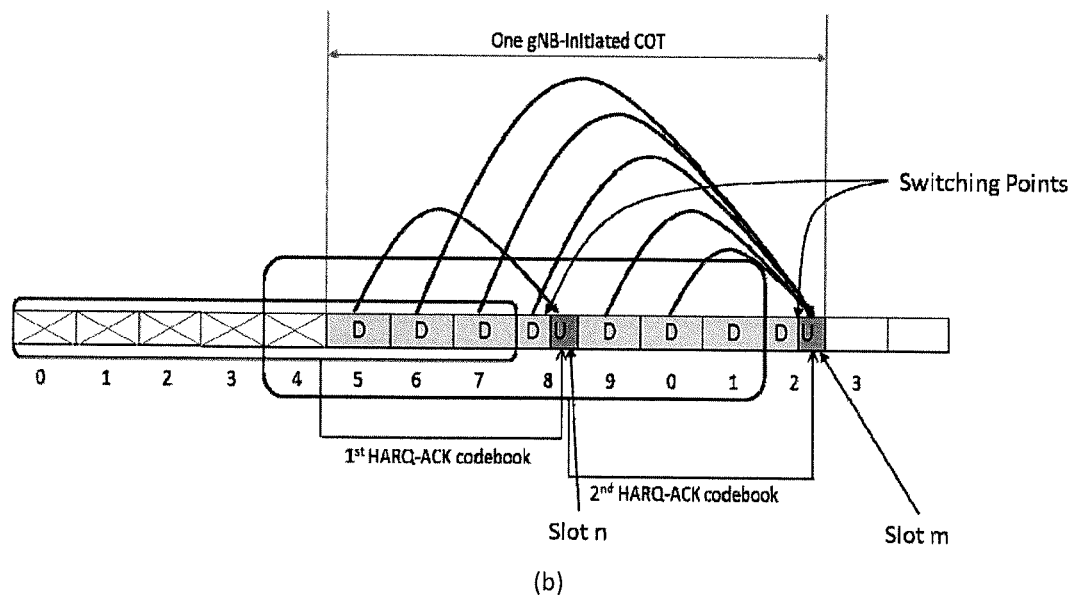

FIGS. 4(a) and 4(b) are schematic diagrams illustrating examples on semi-static HARQ-ACK codebook size reduction for the situation mentioned above according to the second embodiment.

In this example, there are overlapping slots between two downlink association sets for two semi-static HARQ-ACK codebooks, and the first HARQ-ACK codebook is transmitted in slot n and the second one is in slot m. Specifically, one gNB-initiated COT comprises slots 5, 6, 7, 8, 9 in one frame and slots 0, 1 and 2 in the next frame with two switching points (DL-to-UL, DL-to-UL), $K_1$ set is {1, 2, 3, 4, 5, 6, 7, 8}, slot 8 is indicated for the first HARQ-ACK feedback transmission and slot 2 is indicated for the second HARQ-ACK feedback transmission.

Through steps 1 to 6, the downlink association set for the first HARQ-ACK codebook includes slots 5 and 6 while the downlink association set for the second HARQ-ACK codebook includes slots 5, 6, 7, 8, 9 and 0. Specifically, slots 0-4 on the left and slot 3 on the right are excluded from both of the downlink association sets since they are out of the gNB-initiated COT, slot 7 is excluded from the downlink association set for the first HARQ-ACK codebook and slot 1 is excluded from the downlink association set for the second HARQ-ACK codebook since UE needs at least one slot from the end of PDSCH reception to the beginning of the HARQ-ACK transmission based on the UE PDSCH processing capability. As a result, the overlapping slots are slots 5 and 6 for the two HARQ-ACK codebooks.

According to the second embodiment, at step 7, the two overlapping slots are kept in the downlink association set of the first HARQ-ACK codebook and excluded from the downlink association set of the second HARQ-ACK codebook, or vice versa. Therefore, the downlink association set for the first HARQ-ACK codebook includes slots 5 and 6 while the downlink association set for the second HARQ-ACK codebook includes slots 7, 8, 9 and 0. The example is shown in FIG. 4(a).

According to the first variation of the second embodiment, at step 7, the two overlapping slots are halved with a first overlapping slot kept in the downlink association set of the first HARQ-ACK codebook and a second overlapping slot kept in the downlink association set of the second HARQ-ACK codebook. Therefore, the downlink association set for the first HARQ-ACK codebook includes slot 5 while the downlink association set for the second HARQ-ACK codebook includes slot 6, 7, 8, 9 and 0. The example is shown in FIG. 4(b).

As shown in FIGS. 4(a) and 4(b), the proposed step 7 further reduces the semi-static HARQ-ACK codebook size due to avoidance of duplicating HARQ-ACK transmission in overlapping slots.

Figure 5:
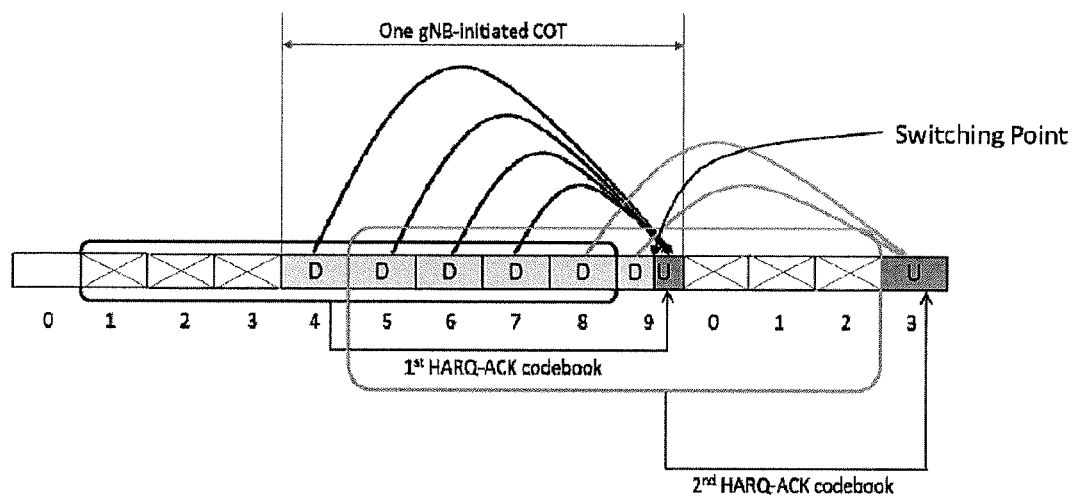
FIG. 5 is a schematic diagram illustrating another example on semi-static HARQ-ACK codebook size reduction according to the second embodiment.

FIG. 5 is a schematic diagram illustrating another example on semi-static HARQ-ACK codebook size reduction according to the second embodiment.

In this example one gNB-initiated COT comprises slots 4, 5, 6, 7, 8, 9 with single switching point, $K_1$ set is {1, 2, 3, 4, 5, 6, 7, 8}, slot 9 is indicated for the first HARQ-ACK feedback transmission inside of the gNB-initiated COT and slot 3 in the second frame outside of the gNB-initiated COT is indicated for the second HARQ-ACK feedback transmission.

Through steps 1 to 6, the downlink association set for the first HARQ-ACK codebook includes slots 4, 5, 6 and 7 and the downlink association set for the second HARQ-ACK codebook includes slot 5, 6, 7, 8, and 9. Here slots 0, 1, and 2 in the second frame are excluded in step 5 since they are after the end of the gNB-initiated COT. The overlapping slots are slot 5, 6 and 7 for the two HARQ-ACK codebooks.

According to the second variation of the second embodiment, at step 7, assuming PDSCH-to-HARQ_feedback timing fields indicate the PDSCHs in slot 5, 6 and 7 are to be acknowledged or non-acknowledged in the first HARQ-ACK codebook in slot 9, slot 5, 6 and 7 are included in the downlink association set of the first HARQ-ACK codebook. Meanwhile, slots 5, 6 and 7 are excluded from the downlink association set of the second HARQ-ACK codebook. Therefore, the downlink association set for the first HARQ-ACK codebook includes slots 4, 5, 6 and 7 while the downlink association set for the second HARQ-ACK codebook includes slots 8 and 9.

As shown in FIG. 5, the proposed step 7 further reduces the semi-static HARQ-ACK codebook size due to avoidance of duplicating HARQ-ACK transmission in overlapping slots.

Figure 6:
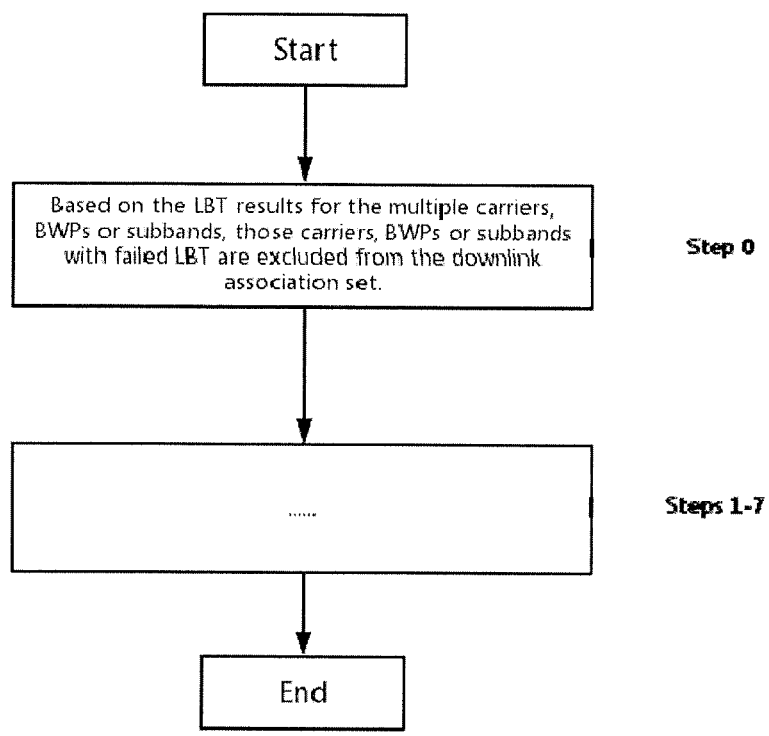
FIG. 6 is a flow chart diagram illustrating a method for a UE to determine the downlink association set for the semi-static HARQ-ACK codebook according to a third embodiment.

FIG. 6 is a flow chart diagram illustrating a method for a UE to determine the downlink association set for the semi-static HARQ-ACK codebook according to a third embodiment.

In case of carrier aggregation or multi-carrier or multiple BWPs or multiple subbands on unlicensed spectrum, where TBs are transmitted in multiple carriers or multiple BWPs or multiple subbands, it is not necessary to transmit HARQ-ACK feedback for the carriers with failed LBT (listen-before-talk) in the semi-static HARQ-ACK codebook. According to the third embodiment, excluding these failed carriers, BWPs or subbands from the downlink association set can further reduce the semi-static HARQ-ACK codebook size. The LBT test results can be indicated by DCI format 2_0 at the beginning of the gNB-initiated COT. Based on this operation, a new step 0 is added before the aforementioned steps 1 to 7 for determining the downlink association set for the semi-static HARQ-ACK codebook.

According to the third embodiment, at step 0, based on the indicated LBT results for the multiple carriers, BWPs or subbands, those carriers, BWPs or subbands with failed LBT are excluded from the downlink association set as shown in FIG. 6.

It should be noted that steps 0-7 described above are not all necessary. It is possible to perform only some of these steps. The order of steps 0-7 is also not mandatory but may be performed in other orders or in parallel. The execution of some steps requires signaling. The collective signaling described in the specification as being used for multiple steps may be replaced with separate signaling for individual step.

Figure 7:
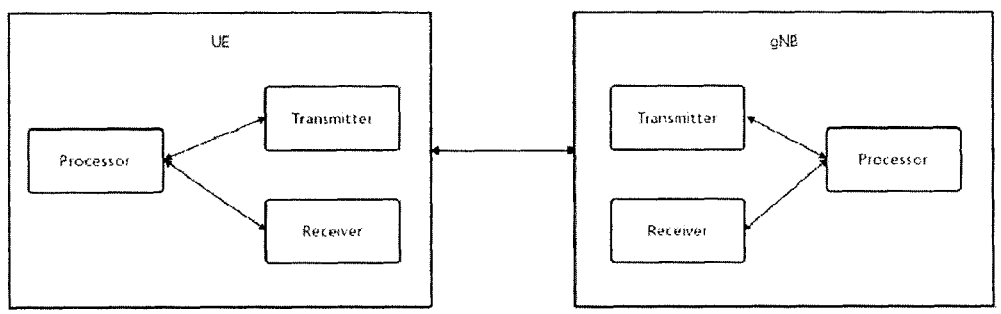
FIG. 7 is a schematic block diagram illustrating apparatuses according to a fourth embodiment.

FIG. 7 is a schematic block diagram illustrating a UE and gNB.

Referring to FIG. 7, The UE includes a processor, a receiver and a transmitter. The processor implements a function, a process, and/or a method which are proposed in FIGS. 1 to 4 above. The gNB includes a processor, a receiver and a transmitter. The processors implement a function, a process, and/or a method which are proposed in FIGS. 1 to 4 above. Layers of a radio interface protocol may be implemented by the processors. The transmitter and the receiver are connected with the processors to transmit and/or receive a radio signal.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

This disclosure proposes method and device to determine the downlink association set for semi-static HARQ-ACK codebook. With this configuration, the semi-static HARQ-ACK codebook is downsized and the overhead is reduced. The method for determining the downlink association set is performed at both gNB and UE to guarantee the same understanding on semi-static HARQ-ACK codebook at both sides.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
   at least one memory; and
   at least one processor coupled with the at least one memory and configured to cause the UE to:
   receive, from a base station, one or multiple downlink transmissions within a channel occupancy time initiated by the base station;
   determine a downlink association set for a hybrid automatic repeat request (HARQ) acknowledgement (ACK) codebook, wherein the downlink association set comprises a set of slots, excludes one or more downlink slots from the downlink association set based on a predefined rule, and generates the HARQ ACK codebook corresponding to the downlink association set, wherein the HARQ ACK codebook comprises HARQ ACK information bits for the one or multiple downlink transmissions; and transmit the HARQ ACK codebook to the base station, wherein the predefined rule comprises excluding the one or more downlink slots from the downlink associate set for downlink transmissions that cannot be acknowledged or non-acknowledged in a slot where the HARQ ACK codebook is to be transmitted.

2. The UE of claim 1, wherein the predefined rule includes excluding the slots outside of the channel occupancy time from the downlink association set.

3. The UE of claim 1, wherein the at least one processor is configured to cause the UE to receive a first signal indicating the downlink and uplink burst split pattern of the channel occupancy time from the base station.

4. The UE of claim 3, wherein the predefined rule includes excluding the uplink only slots, the slots before the start of the channel occupancy time, the slots after the end of the channel occupancy time, or some combination thereof, from the downlink association set based on the first signal.

5. The UE of claim 1, wherein the at least one processor is configured to cause the UE to receive a second signal indicating the start of the channel occupancy time from the base station, and the predefined rule includes excluding the slots before the start of the channel occupancy time from the downlink association set based on the second signal.

6. The UE of claim 1, wherein the at least one processor is configured to cause the UE to receive a third signal indicating the end of the channel occupancy time from the base unit, and the predefined rule includes excluding the slots after the end of the channel occupancy time from the downlink association set based on the third signal.

7. The UE of claim 1, wherein the predefined rule includes excluding the slots where the downlink transmissions cannot be acknowledged or non-acknowledged in the slot where the HARQ ACK codebook is to be transmitted from the downlink association set based on the processing capability of the UE.

8. The UE of claim 1, wherein the at least one processor is configured to cause the UE to receive a fourth signal indicating the result of a channel access procedure for each frequency bandwidth from the base station.

9. The UE of claim 8, wherein the predefined rule includes excluding the frequency bandwidths with failed channel access procedure from the downlink association set based on the fourth signal.

10. The UE of claim 8, wherein the frequency bandwidth is at least one of a carrier, a bandwidth part, a subband and a bandwidth for independent channel access.

11. The UE of claim 1, wherein the predefined rule includes that the HARQ ACK information bits for overlapping slots in two downlink association sets are only included in one predetermined HARQ ACK codebook.

12. A base station, comprising:
at least one memory; and
at least one processor coupled with the at least one memory and configured to cause the base station to:
transmit, to a user equipment (UE), one or multiple downlink transmissions within a channel occupancy time;
determine a downlink association set for a hybrid automatic repeat request (HARQ) acknowledgement (ACK) codebook, wherein the downlink association set comprises a set of slots and excludes one or more downlink slots from the downlink association set based on a predefined rule, wherein the HARQ ACK codebook corresponding to the downlink association set comprises HARQ ACK information bits for the one or multiple downlink transmissions; and
receive the HARQ ACK codebook from the UE.

13. The base station of claim 12, wherein the at least one processor is configured to cause the base station to transmit a first signal indicating the downlink and uplink burst split pattern of the channel occupancy time to the remote unit.

14. The base station of claim 13, wherein the predefined rule includes excluding the uplink only slots, the slots before the start of the channel occupancy time, the slots after the end of the channel occupancy time, or some combination thereof, from the downlink association set based on the first signal.

15. The base station of claim 12, wherein the at least one processor is configured to cause the base station to transmit a second signal indicating the start of the channel occupancy time to the UE, and the predefined rule includes excluding the slots before the start of the channel occupancy time from the downlink association set based on the second signal.

16. The base station of claim 12, wherein the at least one processor is configured to cause the base station to transmit a third signal indicating the end of the channel occupancy time to the UE, and the predefined rule includes excluding the slots after the end of the channel occupancy time from the downlink association set based on the third signal.

17. The base station of claim 12, wherein the at least one processor is configured to cause the base station to transmit a fourth signal indicating the result of a channel access procedure for each frequency bandwidth from the base station.

18. The base station of claim 17, wherein the predefined rule includes excluding the frequency bandwidths with failed channel access procedure from the downlink association set based on the fourth signal.

19. A method of a user equipment (UE), the method comprising:
receiving, from a base station, one or multiple downlink transmissions within a channel occupancy time initiated by the base station;
determining a downlink association set for a hybrid automatic repeat request (HARQ) acknowledgement (ACK) codebook, wherein the downlink association set comprises a set of slots;
excluding one or more downlink slots from the downlink association set based on a predefined rule;
generating the HARQ ACK codebook corresponding to the downlink association set, wherein the HARQ ACK codebook comprises HARQ ACK information bits for the one or multiple downlink transmissions; and
transmitting the HARQ ACK codebook to the base station.

20. A processor for wireless communication, comprising:
at least one controller coupled with at least one memory and configured to cause the processor to:
receive, from a base station, one or multiple downlink transmissions within a channel occupancy time initiated by the base station;
determine a downlink association set for a hybrid automatic repeat request (HARQ) acknowledgement (ACK) codebook, wherein the downlink association set comprises a set of slots, excludes one or more downlink slots from the downlink association set based on a predefined rule, and generates the HARQ ACK codebook corresponding to the downlink association set, wherein the HARQ ACK codebook comprises HARQ ACK information bits for the one or multiple downlink transmissions; and transmit the HARQ ACK codebook to the base station, wherein the predefined rule comprises excluding the one or more downlink slots from the downlink associate set for downlink transmissions that cannot be acknowledged or non-acknowledged in a slot where the HARQ ACK codebook is to be transmitted.

\* \* \* \* \*